UNITED STATES PATENT OFFICE.

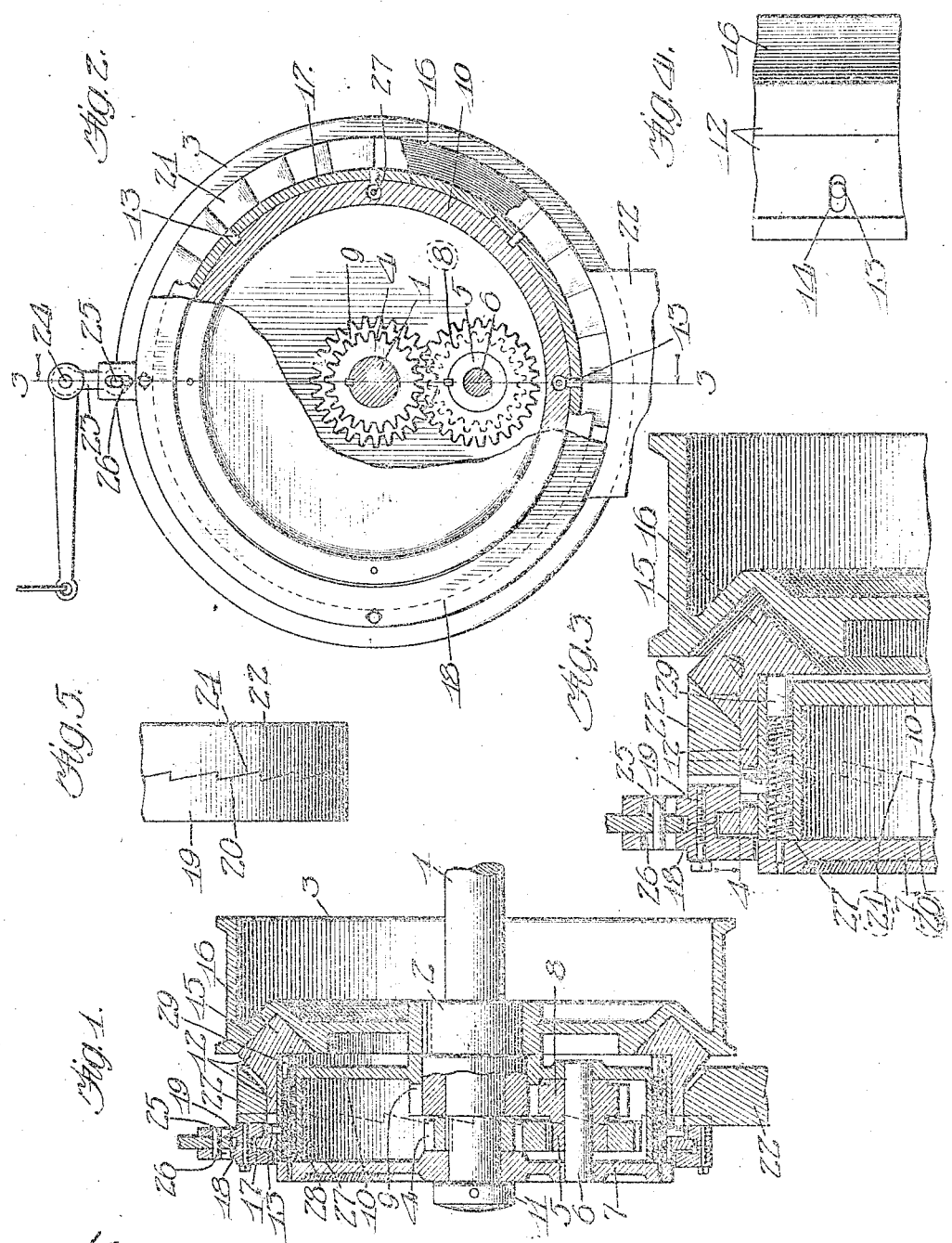

SHERMAN T. LEWIS, OF MILWAUKEE, WISCONSIN, ASSIGNOR OF TWO-THIRDS TO RETTA PIERCE DAVENPORT AND EVERETT C. ROCKWELL, OF CHICAGO, ILLINOIS.

VARIABLE-SPEED GEARING.

No. 884,172.  Specification of Letters Patent.  Patented April 7, 1908.

Application filed April 13, 1907. Serial No. 367,911.

*To all whom it may concern:*

Be it known that I, SHERMAN T. LEWIS, a citizen of the United States, residing at Milwaukee, in the county of Milwaukee and State of Wisconsin, have invented a certain new and useful Improvement in Variable-Speed Gearing, of which the following is a specification.

My invention relates to transmission gearing, more particularly of the type commonly referred to as "variable-speed gearing."

Although my invention is applicable to a wide variety of uses, it is especially advantageous in connection with motor cycles and like self-propelled vehicles.

The object of the invention is to provide means whereby the driving or power shaft may be permitted to rotate continuously at constant speed, and, at the same time, permit the vehicle either to remain still or to move at various rates of speed in accordance with the desires of the operator.

As contributary to the general object of the invention, it is my purpose to provide a construction such that the change from no speed to the various actual speeds may be accomplished without shock or jar, and without danger of breaking or straining any of the parts, either of the transmission gearing or of the vehicle itself.

I accomplish my objects by the mechanism illustrated in the accompanying drawings in which Figure 1 is a view of the device taken chiefly in section through the main axis. Fig. 2 is an end view of the complete device partly in section, to show the construction of the interior mechanism. Fig. 3 is a fragmentary view taken in section and similar to Fig. 1, the parts being drawn to increased scale to better illustrate the construction. Fig. 4 is a fragmentary detail view taken on line 4—4, Fig. 3, looking in the direction of the associated arrows, and Fig. 5 is a fragmentary detail showing a portion of the periphery of the correspondingly beveled stationary and controlling members.

Similar numerals refer to similar parts throughout the several views.

Referring to the drawings, the main shaft 1 constitutes the driving member and is connected to the engine or other power device of the machine. Upon said shaft is loosely mounted a collar 2 upon which is keyed the driven member 3, which, in the present instance, is shown in the form of a band wheel, but may assume any other form desired A gear wheel 4 is keyed or otherwise rigidly secured to shaft 1 in position to engage with the gear wheel 5 which is loosely mounted upon the pin 6 in the disk 7. Said gear wheel 5 is rigidly secured to, and is preferably integral with the gear wheel 8 which meshes with the gear wheel 9, which is preferably integral with the collar 2 above mentioned. Gear wheels 4 and 9 are concentric but rotatable independently of each other and the construction and relation of the parts is such that the rotary movement of the wheel 4 will be transmitted to wheel 9 and collar 2 through the agency of the gear wheels 5 and 8. In the present instance the pin 6 is parallel to shaft 1 and the gear connections 4, 5, 8 and 9 are spur gears. I am aware, however, that gearing other than spur gears may be employed with like result, the present construction being preferred on account of its simplicity. The pin 6, which constitutes an axle for the two integral gears 5 and 8 is supported at one end upon disk 7, and at the other end upon the member 10 which bears upon and is rotatable independently of collar 2. The member 7 has a bearing upon and is rotatable independently of shaft 1 and is held in position thereon by means of the collar 11, which is penned or otherwise rigidly secured to the shaft 1. It is obvious, however, that other suitable devices may be employed for holding the parts in assembled position. The members 7 and 10 are rigidly secured together in any approved manner, and together constitute what may be termed the "intermediate member." The idea of forming the intermediate member in two parts is not essential to the theory of operation or principle of my invention, this construction being adopted merely for structural reasons and convenience in assembling the elements of the device.

Mounted upon the intermediate member 7, 10 in such manner as to be rotatable therewith is a controlling member 12, which is annular and has a sliding bearing upon the cylindrical periphery of part 10. In order to permit said controlling member to slide upon part 10 in a direction parallel to the axis of the shaft 1, and at the same time cause said members 10 and 12 to rotate as a single piece, pins 13 are screwed or otherwise rigidly secured in the cylindrical periphery of member 10 and project through the slots 14 formed in member 12. This construction, which is best illustrated in Fig. 4 taken in connection with Fig. 3, permits axial movement of member 12, but causes the members 10 and 12 to rotate in unison. Controlling member 12 is adapted to make frictional contact with the driven member 3, and in order to increase the friction between them, I prefer to form an annular groove 15 in the face of member 3 adjacent to member 12, and to form upon member 12 in juxtaposition to said groove, an annular ridge 16. In this manner I not only increase the area of contact surfaces but by forming the same oblique to the axis of the device, produce a wedging action which greatly increases the efficiency of the driving action of member 12 upon member 3.

The means for producing the axial movement of the controlling member 12 constitutes one of the features of my invention, and will now be described. Controlling member 12 is provided with an annular flange 17 which is received within a shifting ring composed, in the present instance, of the two parts 18 and 19, bolted or otherwise rigidly secured together. The forming of said controlling ring in two parts is, however, a matter of convenience, and the construction may be varied without departing from the spirit of the invention. On one face of ring 19 are formed a series of beveled surfaces 20 adapted to fit the correspondingly beveled surfaces 21 upon the stationary member 22. Said member 22 is secured to or may form a part of the framework of the vehicle, and is, consequently, non-rotatable and non-shiftable. The surfaces 20 and 21 are oblique to the axis of shaft 1, as shown in Figs. 1 and 5, and in consequence, the rotation of ring 18, 19 produces a movement of said ring toward and from member 22, depending upon the direction in which the ring is rotated. The parts are so designed that the rotation of said ring within the limits of one of said bevel surfaces is sufficient to move the controlling member 12 from one extreme position, shown in Fig. 1, to the opposite extreme position, shown in Fig. 3. In the last mentioned position, member 12 is in close contact with said stationary member 22, and hence is prevented from rotating. It is desirable that the surface of contact between members 12 and 22 should be oblique also, as illustrated in Figs. 1 and 3. The rotative effect necessary to produce a shifting of the ring 18, 19 with its connected controlling member 12 may be accomplished in any suitable manner, the preferred means being a controlling lever 23 which is pivoted upon the stationary shaft 24 and at one end has a pin 25 working in the slots 26 formed in said rings 18, 19.

It is desirable that under normal conditions, when no power is applied to the operating lever 23, the controlling member 12 should be in close contact with the driven member 3, for this is the condition which probably will most frequently obtain in actual use of the device. To this end I mount compression springs 27 in suitable casings 28 formed at two or more points in the intermediate member 10, said springs abutting at one end against the member 7 and at the other end against the plungers or washers 29, which contact the portion 16 of controlling member 12.

I will now describe the operation of the mechanism. Suppose it is desired to cause the driven member 3 to rotate at the same speed as the driving shaft 1. The operating lever 23 is released by hand which permits springs 27 to force the controlling member 12 into close frictional contact with said driven member 3, said member 3 and the gear wheels 4, 5, 8 and 9 and the intermediate member 10 will then be locked together. Under these conditions the entire mechanism except the non-rotating parts 18, 19 and 22 will rotate in unison.

Suppose, now, it is desired to permit the driven member 3 to run at a speed less than the speed of shaft 1. The operator will throw the lever 23 in such manner as to rotate ring 19 in a direction against the pitch of the contacting surfaces 20 and 21 which withdraws controlling member 12 from contact with the driven member 3 and brings it into contact with the stationary member 22. This arrests said controlling member, holding it and the intermediate member 7, 10 still, at the same time freeing the driven member 3. The rotation of shaft 1 will now be imparted to member 3, not directly, but through the agency of the gears 4, 5, 8 and 9 and collar 2 to said driven member 3. The speed of said member 3 will then be less than the speed of shaft 1, the speed ratio depending upon relative proportions of the aforesaid gears 4, 5, 8 and 9. Now let it be supposed that it is desired to permit shaft 1 to run without imparting rotation to the member 3. The controlling lever 23 is moved to such position that the controlling member 12 will assume an intermediate position free from both member 3 and the stationary member 22. The pinion 4 will rotate and will result in a certain speed of rotation of the pin 6 and intermediate member 7, 10; but the inertia of the motor cycle will prevent the member 3 from rotating the only tendency to rotation being the friction of the gear connections. If desired a positive brake may be applied to said member 3 when the controlling member is in intermediate position. It is apparent therefore that the member 3 may rotate in unison with shaft 1, at a reduced speed or may remain still depending upon the axial position of the controlling member 12.

Although I have described a condition in which shaft 1 is the driving member and wheel 3 the driven member, the action may be reversed if desired, that is, wheel 3 may be the driving member and shaft 1 the driven member.

What I claim as new and desire to secure by Letters Patent, is:

1. In transmission gearing, a driving member, a driven member, rotatable independently thereof, an intermediate member, gear connections between said driving and driven members, part of said gear connections being mounted on said intermediate member, a stationary member and a controlling member permanently connected to said intermediate member to thereby rotate therewith or prevent it from rotating, said controlling member being adapted to occupy a plurality of positions, in one position in engagement with said driven member to thereby cause it and the driving member to rotate at equal speeds, and in another position in engagement with said stationary member to thereby arrest said intermediate member and cause the motion of the driving member to be transmitted to the driven member by way of said gear connections, in combination with means for shifting said controlling member to its different positions, said shifting means comprising a hand operated member having beveled surfaces coöperating with beveled surfaces on said stationary member.

2. In transmission gearing, a driving member, a driven member rotatable independently thereof, an intermediate member, gear connections between said driving and driven members, part of said gear connections being mounted on said intermediate member, a stationary member and a controlling member permanently connected to said intermediate member to thereby rotate therewith or prevent it from rotating, said controlling member being adapted to occupy a plurality of positions, in one position in engagement with said driven member to thereby cause it and the driving member to rotate at equal speeds, and in another position in engagement with said stationary member to thereby arrest said intermediate member and cause the motion of the driving member to be transmitted to the driven member by way of said gear connections, in combination with a shifting member having beveled surfaces adapted to coöperate with beveled surfaces on said stationary member, said beveled surfaces being oblique to the axis of the device and said shifting member being rotatable through a limited arc for causing the inter action of said beveled surfaces.

3. In transmission gearing, a driving member, a driven member, rotatable independently thereof, an intermediate member, gear connections between said driving and driven members, part of said gear connections being mounted on said intermediate member, a stationary member and a controlling member permanently connected to said intermediate member to thereby rotate therewith or prevent it from rotating, said controlling member being adapted to occupy a plurality of positions, in one position in engagement with said driven member to thereby cause it and the driving member to rotate at equal speeds, and in another position in engagement with said stationary member to thereby arrest said intermediate member and cause the motion of the driving member to be transmitted to the driven member by way of said gear connections, and said controlling member being spring urged toward said driven member.

4. In transmission gearing, a driving member, a driven member rotatable independently thereof, an intermediate member, gear connections between said driving and driven members, part of said gear connections being mounted on said intermediate member, a stationary member and a controlling member permanently connected to said intermediate member to thereby rotate therewith or prevent it from rotating, said controlling member being adapted to occupy three positions, in one position in engagement with said driven member to thereby cause it and the driving member to rotate at equal speeds, and in another position in engagement with said stationary member to thereby arrest said intermediate member and cause the motion of the driving member to be transmitted to the driven member by way of said gear connections, and in an intermediate position out of contact with said intermediate and driven members to thereby permit said driven member to remain still in combination with a shifting member having beveled surfaces adapted to coöperate with beveled surfaces on said stationary member, said beveled surfaces being oblique to the axis of the device and said shifting member being rotatable through a limited arc for causing the inter action of said beveled surfaces.

In witness whereof, I have hereunto subscribed my name in the presence of two witnesses.

SHERMAN T. LEWIS.

Witnesses:
K. SHAWVAN,
HARRY REITMAN.